United States Patent
St. Mary et al.

(10) Patent No.: US 12,199,990 B2
(45) Date of Patent: Jan. 14, 2025

(54) OPEN ARCHITECTURE SECURED INTEL MULTI-LEVEL SECURITY SYSTEM

(71) Applicant: Odyssey Systems Consulting Group, Ltd., Wakefield, MA (US)

(72) Inventors: Stephen St. Mary, Medfield, MA (US); Andrew Kennedy, Holliston, MA (US); Alessandro Agnello, Peabody, MA (US)

(73) Assignee: Odyssey Systems Consulting Group, Ltd., Wakefield, MA (US)

( * ) Notice: Subject to any disclaimer, the term of this patent is extended or adjusted under 35 U.S.C. 154(b) by 260 days.

(21) Appl. No.: 17/805,917

(22) Filed: Jun. 8, 2022

(65) Prior Publication Data

US 2022/0400119 A1    Dec. 15, 2022

Related U.S. Application Data

(60) Provisional application No. 63/209,711, filed on Jun. 11, 2021.

(51) Int. Cl.
*H04L 9/40* (2022.01)
(52) U.S. Cl.
CPC ............ *H04L 63/105* (2013.01); *H04L 63/20* (2013.01)
(58) Field of Classification Search
CPC .............................. H04L 63/105; H04L 63/20
See application file for complete search history.

(56) References Cited

U.S. PATENT DOCUMENTS

| | | | |
|---|---|---|---|
| 9,712,541 B1* | 7/2017 | Harris | H04L 63/108 |
| 2009/0055477 A1* | 2/2009 | Flesher | H04L 63/302 |
| | | | 709/204 |
| 2010/0257587 A1* | 10/2010 | Chazin | H04L 67/02 |
| | | | 726/3 |
| 2018/0241717 A1* | 8/2018 | Bond | H04L 63/02 |
| 2019/0386957 A1* | 12/2019 | Leon | H04L 63/0876 |

OTHER PUBLICATIONS

A Cloud-Oriented Cross-Domain Security Architecture, by Nguyen et al.; published 2010. (Year: 2010).*

* cited by examiner

*Primary Examiner* — Vu V Tran
(74) *Attorney, Agent, or Firm* — Hunton Andrews Kurth LLP

(57) ABSTRACT

Exemplary embodiments include a system to prevent flow of data or cross-contamination from a higher level classification system to a lower level classification system. A cross domain guard allows a data or network connection between processors handling data of different classification levels. The cross domain guard may allow for uni-directional or bi-directional data flow. The guard may allow flow of data from the lower level to the higher level. A normalization server may be used to allow for exchange and/or input and/or processing of data or material from different sources. The normalization server receives an input from a source (e.g., a platform, a payload, a system, open source, etc.). The input data may be a particular format. The normalization server may perform any required data conversion.

18 Claims, 10 Drawing Sheets

OPEN ARCHITECTURE SECURED INTEL MULTI-LEVEL SECURITY SYSTEM

PRIORITY CLAIM

This application claims priority to U.S. Provisional Application No. 63/209,711, filed on Jun. 11, 2021. The contents of this priority application are incorporated by reference herein in their entirety.

FIELD OF THE INVENTION

Exemplary embodiments generally relate to systems and methods that provide an innovative cross-domain solution. Specifically, exemplary embodiments provide an architecture that eliminates or significantly reduces the need for re-accreditation of the cross-domain solution as needs evolve.

BACKGROUND

Current cross-domain solutions operate based upon a very strict, pre-defined data source, data structure and rule set allowing or blocking transmission across security boundaries. Current and foreseeable policies mandate that any alteration to a cross-domain solution requires a program office to re-accredit the system—an extremely time, labor and cost intensive process. For example, re-accreditation typically takes up to a year or more. Often the pace of operations and technology overrun this process making the newly accredited system of less or no utility as the mission needs and technology have since moved on.

These and other drawbacks exist.

SUMMARY OF EXEMPLARY EMBODIMENTS

An exemplary embodiment includes a system having one or more external data sources configured to generate one or more output data streams in a first format; a guard normalization server, communicatively coupled to the one or more external data sources and configured to receive the output data streams in the first format, convert the output data streams to a second format and transmit the converted output data streams in the second format to a cross domain guard; and the cross domain guard communicatively coupled to the guard normalization server and configured to receive the converted output data streams in the second format and then transmit the converted output data streams to at least one server that is configured to process the converted output data streams at a specific classification.

Another exemplary embodiment includes a method that includes steps of receiving, at a guard normalization server, one or more data streams in a first format, the one or more data streams being generated by one or more external data sources and being received in a domain with a first classification level; converting, by the guard normalization server, the one or more output data streams to a second format; transmitting, by the guard normalization server, the converted output data streams in the second format to a cross domain guard; and processing, by the cross domain guard, the converted output data streams in the second format for transmission to at least one server located in a second domain and that is configured to process the converted output data streams at a second classification level, wherein the second classification level differs from the first classification level.

These and other advantages will be described more fully in the following detailed description.

BRIEF DESCRIPTION OF THE DRAWINGS

In order to facilitate a fuller understanding of the various embodiments, reference is made to the attached drawings. The drawings should not be construed as limiting the various embodiments, but are intended only to illustrate different aspects and embodiments.

DETAILED DESCRIPTION

Figure 1:
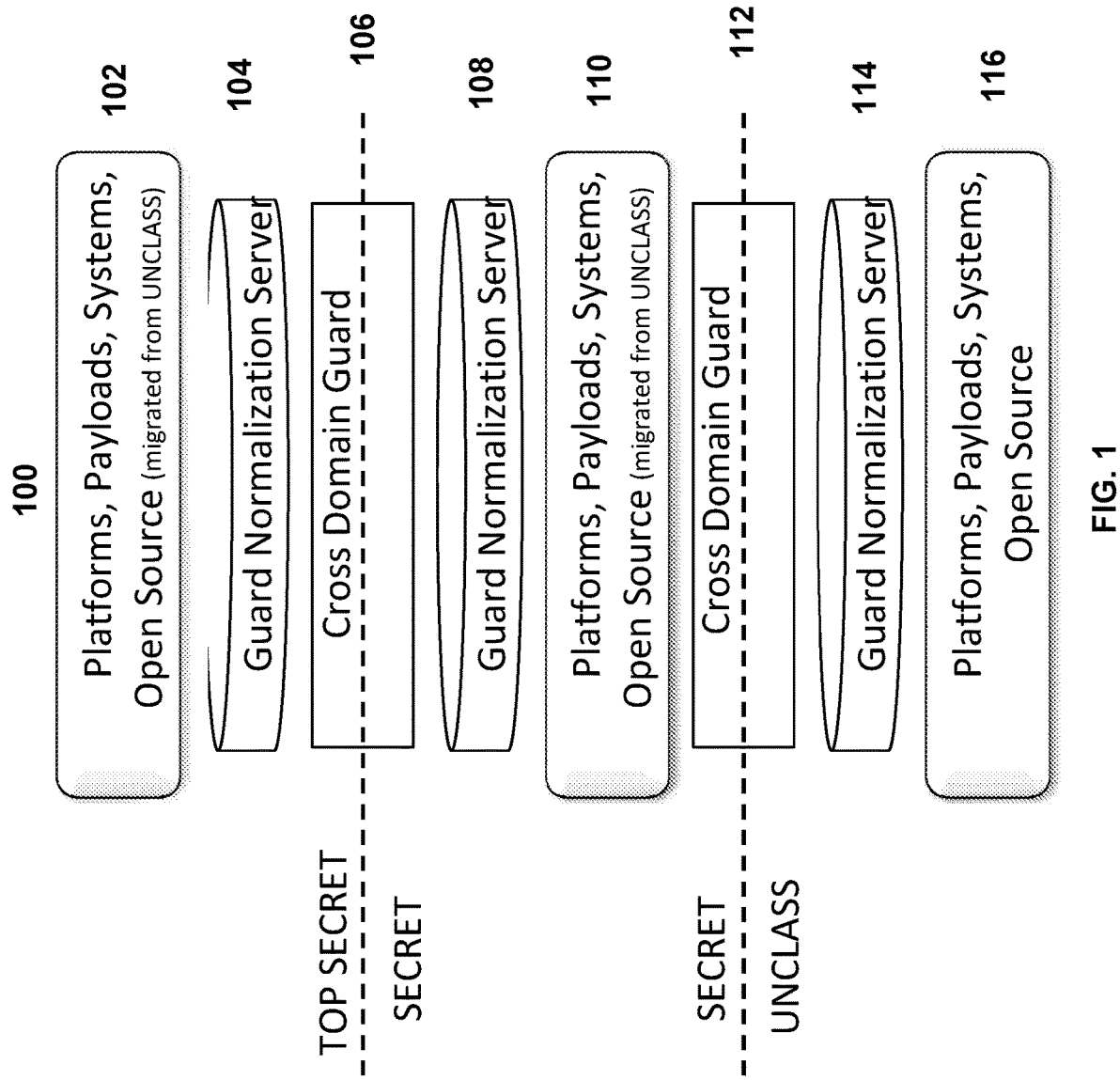
FIG. 1 depicts a system according to exemplary embodiments.

The following description is intended to convey an understanding of exemplary embodiments by providing specific embodiments and details. It is understood, however, that various embodiments are not limited to these specific embodiments and details, which are exemplary only. It is further understood that one possessing ordinary skill in the art, in light of known systems and methods, would appreciate the use of various embodiments for its intended purposes and benefits in any number of alternative embodiments, depending upon specific design and other needs.

The following descriptions provide different configurations and features according to exemplary embodiments. While certain nomenclature and types of applications/hardware are described, other names and application/hardware usage is possible and the nomenclature provided is done so by way of non-limiting examples only.

The exemplary embodiments may include descriptions regarding the use of the systems and methods in military related environments (e.g., warfighters may refer to military personnel) where various classifications of intelligence data are handled and processed in accordance with government rules and regulations. However, these descriptions are meant to be non-limiting as one of ordinary skill in the art will appreciate that exemplary embodiments have applications outside of these environments and can be used where data having different sensitivities is required to be processed and handled in accordance with certain rules and regulations, such as, for example, personal and health related data and sensitive industrial or corporate information.

Data or material may be classified at different levels. For government and defense purposes, data may be classified as unclassified, secret, or top secret (in increasing level of sensitivity). Other classifications may be used and each classification level may have sub-classifications or categories within it. Each level of data (e.g., unclassified, secret, and top secret) may be processed on a different machine (e.g., server or computer). The different classification levels require different certifications and/or accreditations and/or requirements to process said data or material. A machine that handles top secret data may process top secret, secret, and unclassified data. A machine that handles secret data may process secret and unclassified data. In various embodiments the top secret classification may include sensitive compartmented information (SCI).

To prevent flow of data or cross-contamination from a higher level classification system to a lower level classification system, processors are generally isolated from one another. However, to allow for data flow between different classification levels and domains, a cross domain guard may be used. According to an embodiment, the cross domain guard may allow a data or network connection between processors handling data of different classification levels. The cross domain guard may allow for uni-directional or bi-directional data flow. For example, the cross domain guard may ensure that data of a higher level is not transmitted to a machine handling a lower level. The guard may allow flow of data from the lower level to the higher level. Accordingly, the cross domain guard may allow only authorized data to be exchanged between the different systems.

To allow for exchange and/or input and/or processing of data or material from different sources, a normalization server may be used. According to an embodiment, the normalization server receives an input from a source (e.g., a platform, a payload, a system, open source, etc.). The input data may be a particular format. However, a different format may be required for further processing and/or handling of the input data on the receiving cross-domain guard. The normalization server may perform the required data conversion. According to an exemplary embodiment, normalization servers perform conversion of one type of data to a certain format. For example, that format may be proprietary or a combination of proprietary and standardized format.

Exemplary embodiments address the long-standing, unmet needs within the Department of Defense (DoD) and Intelligence Community (IC) for a portable (<20 lbs.), high-speed, cost-effective cross domain solution to support seamless operations across the tactical edge, traditional enterprise and cloud environments. Systems according to exemplary embodiments may be built using agile principles and an open, transparent architecture where this capability can be evolved quickly and cost-effectively, keeping pace with needs of the end user.

Exemplary embodiments may be referred to as Open Architecture Secured Intel Multi-level Security System (OASIMSS). This name is non-limiting. An objective of OASIMSS is directed to leveraging proven, high-performance commercial off the shelf (COTS) equipment using an architecture that substantially eliminates the need for lengthy and costly re-accreditation of the cross-domain solution when operational/data needs evolve. The need to re-accredit a cross domain solution if a single data type is altered is a substantial cause for operational limitations, delays and cost associated with traditional cross domain solutions. Beyond speed, flexibility and cost savings, OASIMSS delivers a first of its kind capability that can support multiple channels of high-rate streaming data to include high-definition, full motion video and imagery in a compact, portable unit. In some embodiments, the unit may be non-portable. For example, enterprise applications may use a non-portable unit.

Too often in various systems, such as those using government-owned equipment, the interface is designed by the delivering contracting companies using proprietary data formats. For example, a sensor may be North Atlantic Treaty Organization (NATO) Standardization Agreement ("STANAG") complaint but the data may be in a format that is non-standards based in either the live stream, through the storage or the means of accessing the data. These proprietary formats are the result of contracted companies designing for one project at a time for one government customer at a time, or in some cases, as a result of block competition for government customers. This data then becomes segregated to one project or one contracted company.

According to exemplary embodiments, a normalization server (described in more detail below) may remedy these deficiencies first by taking in proprietary data and standardizing it to be STANAG compliant and then streaming the STANAG data in real-time while archiving the normalized data. The normalized data can then be transmitted to and across the Cross Domain boundary. Additionally, the normalization server can archive incoming data and then provide access to this data through a non-proprietary access mechanism to the database through an application programming interface (API).

The resulting payoffs may include: (a) End User (e.g., Warfighter) Effectiveness— this solution removes the technical and administrative barriers to delivering the data the end user needs (e.g., to win on the battlefield); (b) Speed— add new data sources in hours or weeks vs. months to years; (c) Flexibility—this approach allows for virtually any data source/type to be accommodated; (d) Cost—agile updates to the normalization service vs. re-accreditation of a cross-domain solution; (e) Size—OASIMSS can provide a robust, multi-intelligence streaming guard in a compact, ~20 lb. solution (e.g., a tactical kit version).

The end user benefits from gaining quick and easy access to timely data available to support a mission—not a narrow sub-set imposed due to traditional guard restrictions. Exemplary embodiments may provide a solution that prevents program offices from being discouraged regarding innovation and using new or upgraded payloads and data source that could enhance the mission capability they provide the end user (e.g., warfighter) due to the time, cost and effort associated with re-accreditation of their existing cross-domain solution.

OASIMSS uses an adaptive architecture to provide a portable, high-speed, cost-effective cross domain solution to support seamless operations across the tactical edge, enterprise and cloud environments. According to exemplary embodiments, OASIMSS may have a full bi-directional 9 Gb/sec throughput with less than 2 millisecond latency with current hardware technology. OASIMSS may be a software solution and be hardware agnostic. This provides the additional advantage of high performance with lowest size, weight and power available.

An exemplary embodiment of OASIMSS may have the following specifications. It should be appreciated that these specifications are exemplary and meant to be non-limiting.

Software can move to next generation hardware—faster, smaller, cheaper;

Open Architecture with robust APIs to facilitate integration and data sharing;

Ingest & display up to 10 video streams with metadata (tactical);

9 Gb/second throughput on 10 Gb network connections;

Low Latency: <2 milliseconds;

Data exchange between external systems via Web Services (SOAP/HTTP);

Support for Common Data Types & Protocols:

Transport Methods: Transport Streams, TCP, SOAP. HTTP, UDP, etc.;

File Types/Needs: Video, Images, Radar/Tracks, BFT, GeoINT, Maps, Target ID, etc.; and File Formats: H.264 w/KLV, JPEG, NTIF, STANAG 4676/4607, XML, KML, KMZ, etc.;

All archived data can be stored locally and/or on Network Attached Storage (rules/space limited);

All archived data can be indexed with temporal/geospatial reference for search and retrieval; and Local and remotely administered software solution.

Because OASIMSS may be a software-based solution, it may be deployed on any hardware capable of meeting mission requirements—from small hand/pack-carried units for mobile users in the field to rack-mount solutions supporting the global Enterprise for stationary solutions. This may be true for tactical level deployments. Other deployments, such as enterprise level, may require additional certifications and may be required to use certain hardware for security reasons.

According to a configuration of an exemplary embodiment, OASIMSS architecture may include two primary components: (1) a Cross Domain Guard (CDG) paired with (2) a Guard Normalization Server (or system) (GNS) for each domain. The CDG is described above and exemplary embodiments may work with any GNS. The GNS is described in below.

As a result of the adaptive architecture used, exemplary embodiments, provide an technological solution to the technical problems identified above. Exemplary embodiments improve the processing and transmission of sensor data between different system domains and support multiple channels of high-rate streaming data to include high-definition, full motion video and imagery in a compact, portable unit.

As noted above, while the hardware of exemplary embodiments may be agnostic, the programmed elements are unique with respect to exemplary embodiments; that is, the software solution provided by exemplary embodiments is unique and specific. Exemplary embodiments improve the functioning of the hardware as described above (relatively high, bi-directional throughput with a low latency). As a result, the cross domain guard and the normalization server are transformed into unique, specially programmed and configured devices, amounting to more than mere conventional, off the shelf hardware.

The adaptive nature of the architecture allows for the guard normalization system/server (GNS) to provide a technological solution to the problems identified above, agnostic of hosting hardware. The hardware agnostic guard normalization server/system is capable to operate while maintaining the embodied improvements of processing the reception, and transmission of data across NSA (National Security Agency) enforced security domains. The unique aspect of the solution allows the system to propagate low latency data across multiple channels to include high-definition, full motion video, RADAR, GMTI, and Imagery. Other data types are capable to cross the various guards, based upon approved rule sets and general protocol of such data.

In summary, the guard normalization system/server allows for an adaptive and optionally compact low latency self-contained system that normalizes data to various STANAG standards across multiple security domains.

In various embodiments, the GNS may be combined with the CDG. In some embodiments, the GNS may be a separate unit that serves as a gateway between the users, systems, data sources and the Cross-Domain Guard where data passes through the GNS for format inspection and normalization prior to being sent to the guard.

The GNS may be a real-time streaming server that ingests, transcodes and normalizes a wide-variety of open source, operations and intelligence data. The GNS may convert ingested data to a format matching the already accredited guard ruleset. In the event a new, complex data source/type is introduced that cannot pass through the GNS, the transcoding engine may be quickly updated to accommodate—typically hours or days to a week. Importantly, this may be realized without modification to the Cross-Domain Guard and without impact to its Accreditation and Authorization.

The above components and descriptions are meant to be exemplary and non-limiting examples, as the server may include other or different components.

FIG. 1 depicts a system according to exemplary embodiments. The system 100 depicts the cross domain guards and the guard normalization servers showing how each resides between platforms, payloads, systems, and open source and classified operating systems. Specifically, the system consists of three classified levels or domains: unclassified (UNCLASS), Secret, and Top Secret. Each domain may represent a separate system that is configured and dedicated to processing material and/or data up to the classification level for that system For example, the Top Secret system can process data up to and including Top Secret data (i.e., unclassified, secret, and top secret data). Each level has a set of platforms, payloads, systems, and open source migrated from UNCLASS shown as 102, 110, and 116 in FIG. 1.

Each level has a guard normalization server shown as 104, 108, and 114 in FIG. 1. According to an exemplary embodiment, the guard normalization server, or normalization server as it may be referred to, allows for exchange and/or input and/or processing of data or material from different sources. In various embodiments, the normalization server may be a real-time streaming server that serves a gateway between users, systems, data sources, and the cross domain guard (described below). All data in a domain must pass through the guard normalization server for format inspection and normalization. The normalization server may receive an input from a source (e.g., a platform, a payload, a system, open source, etc.). The input data may be in a particular format. However, a different format may be required for further processing and/or handling of the input data on the receiving cross-domain guard or other portions of the system. The normalization server may perform the required data conversion. The normalization server performs conversion of one type of data to a certain format. It may convert multiple formats to multiple other formats. For example, that format may be proprietary or a combination of proprietary and standardized format. According to exemplary embodiments, the guard normalization server may be accredited for a broad range of common data types and format standards. The accreditation may ensure that the guard normalization server complies with applicable standards and rules regarding data processing for the types of data (such as, but not limited to, classified and other sensitive data). The guard normalization server may be configured such that it can be quickly and efficiently updated to handle new data types and formats. In various embodiments, the guard normalization server may have an open and non-proprietary API to allow for user interfacing with the guard normalization server to allow for customization and other modifications, such as, but not limited to, to allow for integration of propriety sensor data. The components of the normalization server according to exemplary embodiments are described below with respect to FIG. 5A.

Each level further has a cross domain guard located at the interface between each level shown as 106 and 112 in FIG. 1. According to an exemplary embodiment, the cross domain guard, or high speed guard or simply, guard, as it may be referred to, may allow for uni-directional or bi-directional data flow. The cross domain guard may ensure that data from a higher classification level is not transmitted to a machine, network, or system that is only configured to handle a lower classification level. For example, the cross domain guard may ensure that top secret data is not exchanged with the secret level domain but may allow for secret or unclassified data to be exchanged with that domain. Likewise, the cross domain guard may ensure that secret data is not exchanged with the unclassified domain, but may allow for unclassified data to be exchanged with that domain. The unclassified domain does not require a cross domain guard since the unclassified data can be exchanged with the secret and top secret domains since that data is not classified. The cross domain guard may be complaint and certified with and by appropriate standards, agencies, stakeholders, and other regulations to allow for use in a variety of different systems that process classified data and information.

According to exemplary embodiments, data is ingested from one or more sources, such as those at 102, 110, and/or 116. The data may be from another system or a sensor, such as, but not limited to, a camera, optics, radar, electronic support systems, etc. The data may be of a particular classification level and therefore may be ingested into the appropriate level domain. For example, top secret data is ingested into the top secret domain from the inputs at 102; secret data is ingested into the secret domain from the inputs at 110; and unclassified data is ingested into the unclassified domain at 116. It should be appreciated that secret or unclassified data may be ingested from 102 into the top secret domain and secret or unclassified data may be ingested into the secret domain.

The data ingested (for example purposes only) from the inputs at 102 is fed into the guard normalization server 104, where a data conversion is performed, if necessary. For example the received data from a sensor, etc. may be in a proprietary format associated with the sensor, etc. The guard normalization server converts this proprietary format into a standardized format. Once converted, the data may be used by the system. In various embodiments, the data may go through the cross domain guard 106, in which it is analyzed by a ruleset, and if it passes, it may go through the cross domain guard and into the secret domain. It may further go through the secret domain, through the cross domain guard 112 and into the unclassified domain. The data, once it is in the other domain may be processed and used in that domain. A similar process may occur for data in the secret domain (e.g., data from 110 may go through the guard normalization server 108 and the cross domain guard 112 and/or 106). The unclassified domain only has a guard normalization server 114 because the unclassified data can pass to the secret and top secret domain without any rules or processing by a cross domain guard, but still has to pass through the guard normalization server for inspection and processing prior to being transmitted further in the system.

Figure 2:
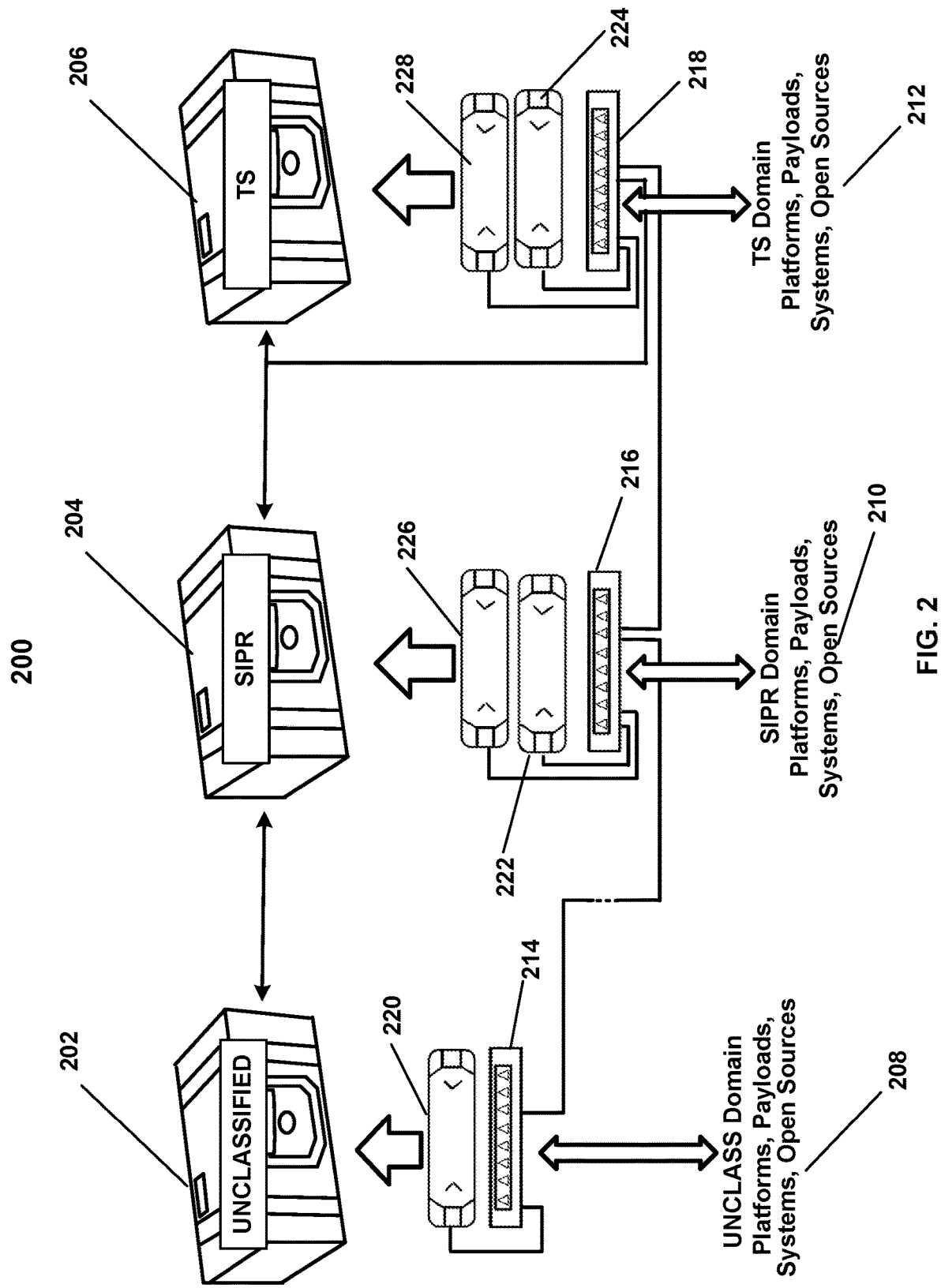
FIG. 2 depicts a system according to exemplary embodiments.

FIG. 2 depicts a system according to exemplary embodiments. The system 200 depicts a view of system similar to that of FIG. 1 depicting the location of the guard and normalization servers located between different domains with different classifications (e.g., unclassified (e.g., Non-classified Internet Protocol Router Network (NIPR or NIPR-Net)), secret (e.g., Secret Internet Protocol Router Network (SIPR or SIPRNet)), and top secret (TS) (e.g., Joint Worldwide Intelligence Communications System (JWICS)).

Specifically, in FIG. 2, three different domains 202, 204, and 206 are depicted: unclassified, secret (shown as SIPR in FIG. 2), and top secret (shown as TS in FIG. 2), respectively. Each domain has its own set of platforms, payloads, systems, and open sources 208, 210, and 212, respectively, as shown in FIG. 2. Each domain is communicatively coupled through network switches 214, 216, and 218 as shown in FIG. 2, with the unclassified domain 202 being communicatively coupled to the secret domain 204 and the secret domain being communicatively coupled to the top secret domain 206. Each domain has a normalization server 220, 222, and 224 as shown. The secret and top secret domains (204 and 206, respectively) each have a high speed guard, shown as 226 and 228 in FIG. 2. Each high speed guard 226, 228 is coupled to the respective domain network switch (216 and 218).

In various embodiments, each of the three domains (202, 204, 206) may have a user/administrative workstation communicatively coupled thereto This workstation (not shown in FIG. 2) may be communicatively coupled to the network switch of its respective domain.

For portability, there may be a high side transit case that contains a cross domain guard, two guard normalization servers, a network switch, and a display and keyboard. A low side transit case may contain a cross domain guard, a guard normalization server, a network switch, and a display and keyboard. A single kit may support bi-directional transfer between two security domains. Two kits may be combined to give a full system that can span unclassified-secret-top secret into a single, seamless solution. The high side transit case may be used to couple a top secret system to a secret system and a secret system to an unclassified system. These transit cases can be coupled to existing systems.

The domains may be portable also, using cases. For example, the cases may have dimensions of 15.2" L×11.4" D×8.5" H for the unclassified domain 202 and 17.3" L×13" D×9.8" H for the secret and top secret domains 204 and 206. The system of FIG. 2 can then be formed in a remote environment using the components of the portable and transit cases. The system of FIG. 2 may fit in a standard rack, thus saving space and size in installation.

The kits may each include a common platform solution that may include the following components (it should be appreciated this listing is exemplary and non-limiting as other components may be used of higher or lower specifications):

Red hat Linux operating system;
Windows Server Operating system;
Intel Core i7-8 core, Intel Core i9 9900 K processor (3.6 GHz up to 5.0 GHz);
GPU—NVIDIA QUADRO P1000 Graphics;
4+TB solid state storage;
64+GB DDR4 RAM;
Cisco 1 GB Ethernet switch; and
Weight approx. 20 lbs.

Figure 3A:
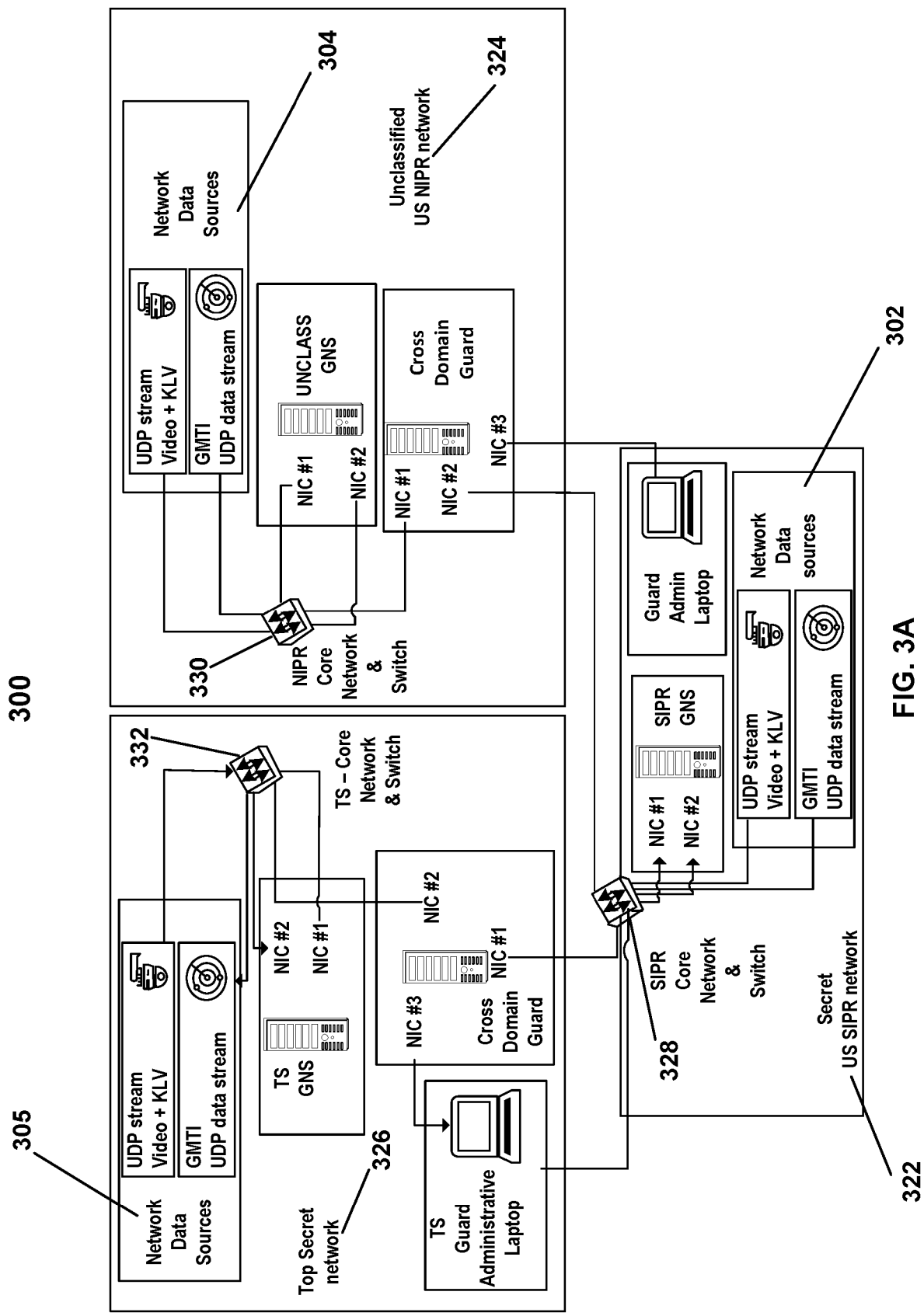
FIG. 3A depicts an exemplary system configuration.
Figure 3B:
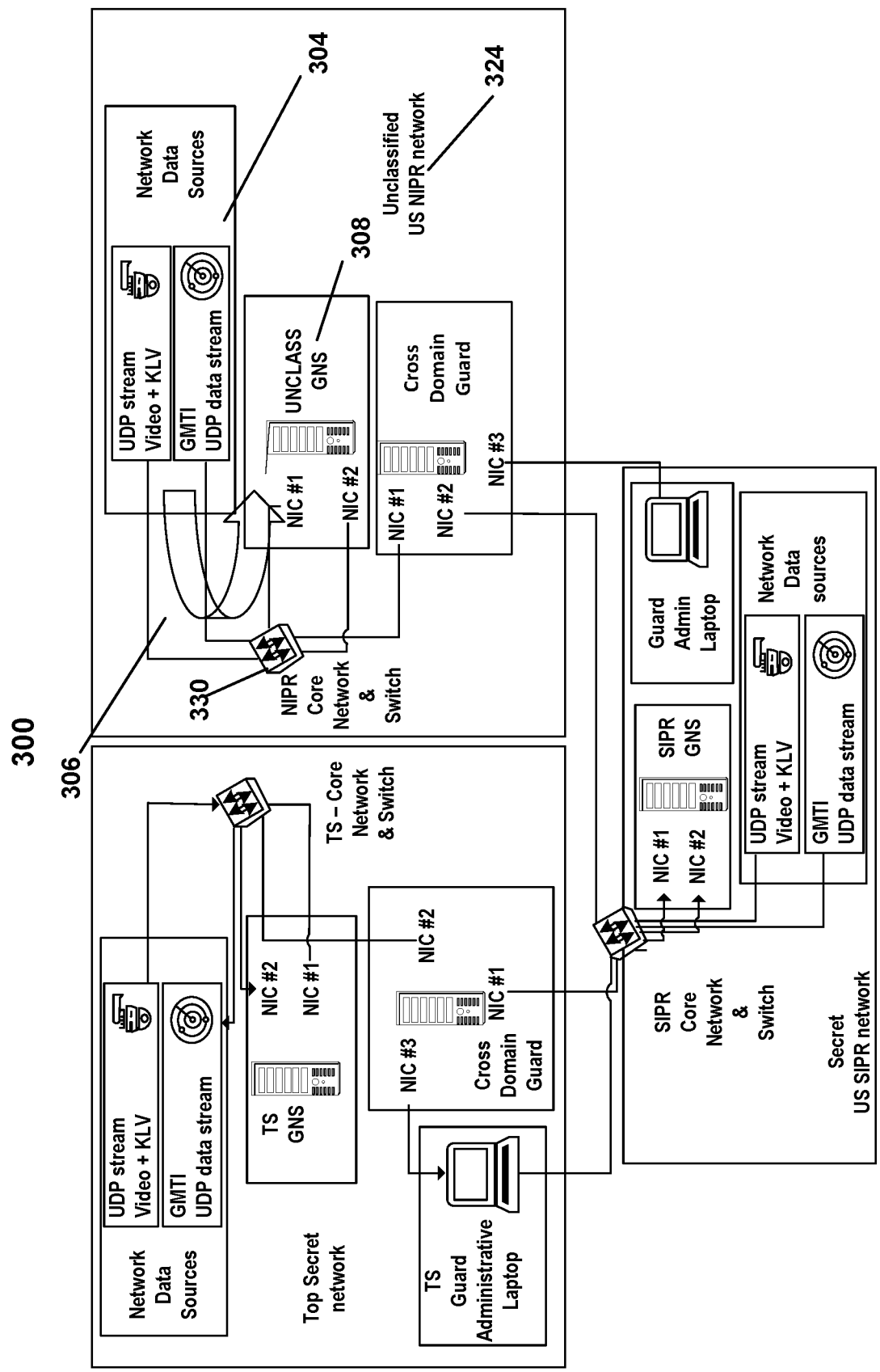
FIG. 3B depicts a first data flow in the system of FIG. 3A.
Figure 3C:
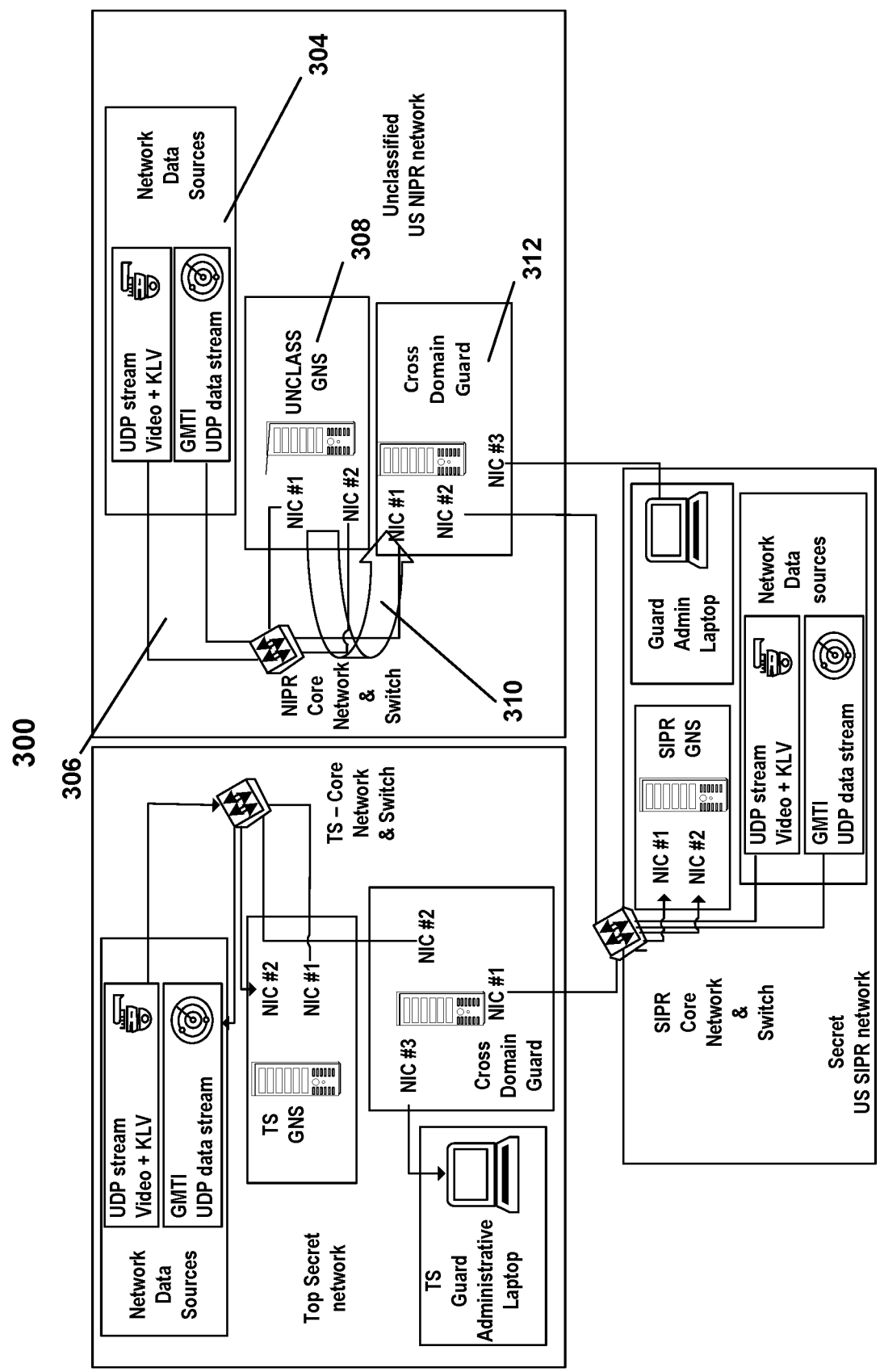
FIG. 3C depicts a second data flow in the system of FIG. 3A.
Figure 3D:
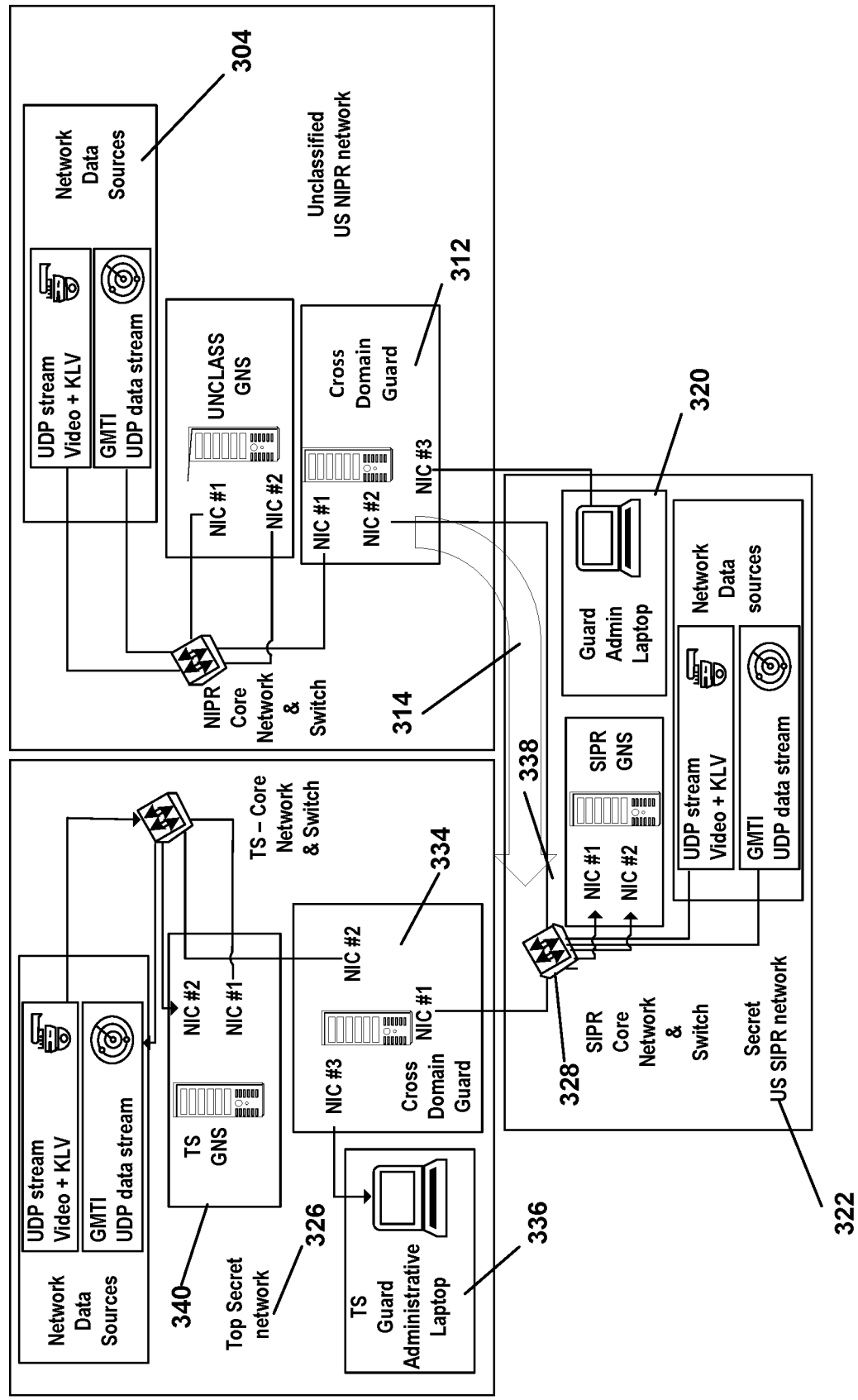
FIG. 3D depicts a third data flow in the system of FIG. 3A.

FIG. 3A depicts a system in an exemplary configuration. This figure depicts an actual system configuration used according to an exemplary embodiment. FIG. 3A depicts the system 300. FIGS. 3B, 3C, and 3D depict data flow in the system 300 (i.e., each successive figure is of the system 300).

The system 300 may include multiple network sources 302, 304, 305. For purposes of this example, each network source may be a radar network stream or download file. However, it should be appreciated that the network source may be any suitable data source as described herein. The network stream may represent more than one or multiple data streams. In some embodiments, the multiple data streams may include audio and video file types and/or streams. The video may be live, real-time full motion video and may include an audio track.

Network sources 302, 304, 305 may input into three different places to the system 300 as depicted in FIG. 3A, for example. Each network source may include sources of a particular classification level and thus input into the appropriate system. In some embodiments, network sources 304 and 305 may be different sources than network source 302 and network sources 304 and 305 may be different from each other. That is, there may be three different network sources into the system 300. In some embodiments, the network sources 302, 304, 305 may represent the same network source having multiple input points into the system 300, each of a different classification level.

As depicted in FIG. 3A, network sources 302, 304, 305 may input to or be communicatively coupled to a different network (322, 324, 326), with each network having a different classification level. The classification level (in this example, Secret, Unclassified or UNCLASS, and Top Secret or TS), may represent the highest level of classified material or data the system is capable of and/or certified to process. Each network source may be communicatively coupled to a network switch (328, 330, 332) for the appropriate network (322, 324, 326).

In FIG. 3B, an example of a data flow in the unclassified network 324 is represented by arrow 306. This data from network source 304 arrives into the system 300 through a network connected switch 330. In exemplary embodiments, gigabit Ethernet may be used allowing multiple streams to use one port on the switch. In various embodiments, the input may use multiple ports on switch 330. The data may flow from the switch 330 into the guard normalization server 308.

In FIG. 3C, the data may be forwarded by the guard normalization server 308 (as shown at 310) and flow to the high speed guard or cross-domain guard 312. The data may be forwarded by the guard normalization server 308 and may be normalized as described herein. The guard normalization server may be configured as described herein, such as described below with respect to FIG. 5A.

In FIG. 3D, the data may be forwarded (as shown at 314) from the high speed guard 312 to a network switch 328. The network switch 328 may be part of the secret portion 322 of the system 300. The network switch 328 may forward the data to various portions of the secret portion of the network, such as computer 320. The network switch 328 may also forward the data to a high speed guard or cross-domain guard 334 that is located in the top secret portion 326 of the system 300. This high speed guard (334) may forward the data to various portions of the top secret portion 326 of the system 300, such as computer 336. In various embodiments, the computers 320 and 336 may be for administration of the system 300 and/or certain parts of the system such the SIPR or TS network.

It should be appreciated, as can be seen from FIGS. 3A-3D, that data may be routed in a similar manner no matter which portion of the system 300 received the input data, file, or streams. Each portion (e.g., unclassified, secret, and top secret) has a guard normalization server (310, 338, 340). This ensures the continuity and security of data throughout the system 300. There are cross-domain guards (312, 334) at the interface between the secret and unclassified portions and the secret and top secret portions.

Figure 4:
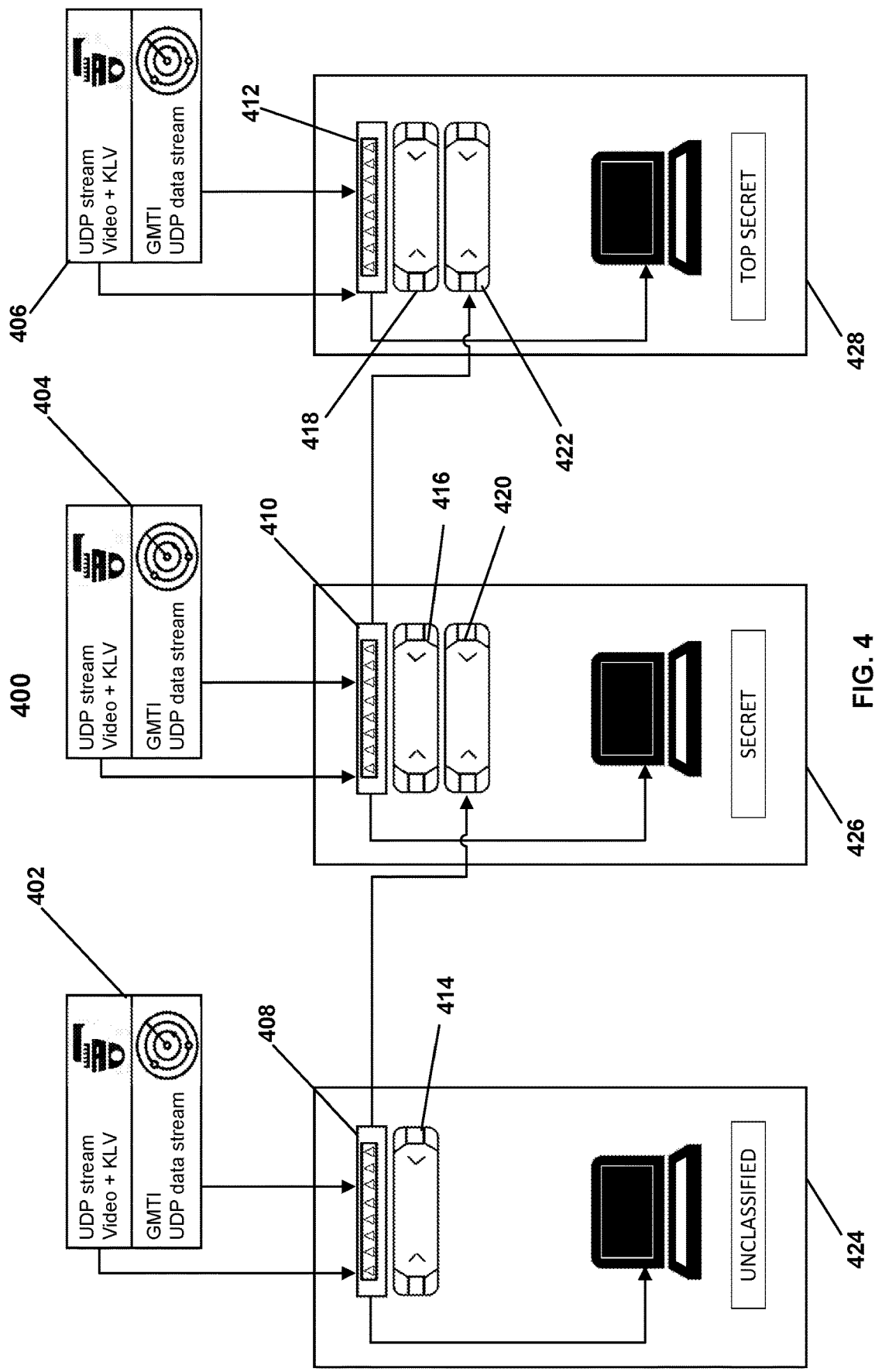
FIG. 4 depicts a system according to exemplary embodiments.

FIG. 4 depicts a system according to exemplary embodiments depicting input from data sources to the normalization server at two different points. The system 400 may represent a similar system to that of the system 200 and 300 depicted in FIGS. 2 and 3A-D, respectively. For example, the system 400 may have network sources 402, 404, and 406 that feed into network switches 408, 410, and 412 for the respective domain (i.e., unclassified, secret, or top secret). The network sources are depicted here as having to data stream inputs, but this is meant to be exemplary and non-limiting. Each domain has a normalization server (414, 416, 418). The secret and top secret domains have cross domain guards 420 and 422. The flow of data and information may be similar to that described for FIGS. 2 and 3A-3D. Each system domain (unclassified 424, secret 426, and top secret 428) may represent a portable and self-contained system. For example, the domains may be portable and packaged in containers such as described for FIG. 2. The network sources 402, 404, 406 may be separate from and external to the system domains 424, 426, 428. The system domains may be communicatively coupled to these network sources once set-up. The network sources may be remotely located from the system domains and may be communicatively coupled to the system domains through a dedicated network and/or the Internet and/or another network. The network sources may be communicatively coupled to the system domains through multiple networks in some embodiments. In various embodiments, the network sources may be directly coupled to the system domains. In some embodiments, the network sources 402, 404, 406 may represent different inputs from the same source. For example, the UDP Stream Video+KLV and GMTI UDP data stream (depicted in FIG. 4) may be from the same sensor. The streams may be separated and input into the different system domains based on the classification level of the data contained in the data stream from the sensor.

Figure 5A:
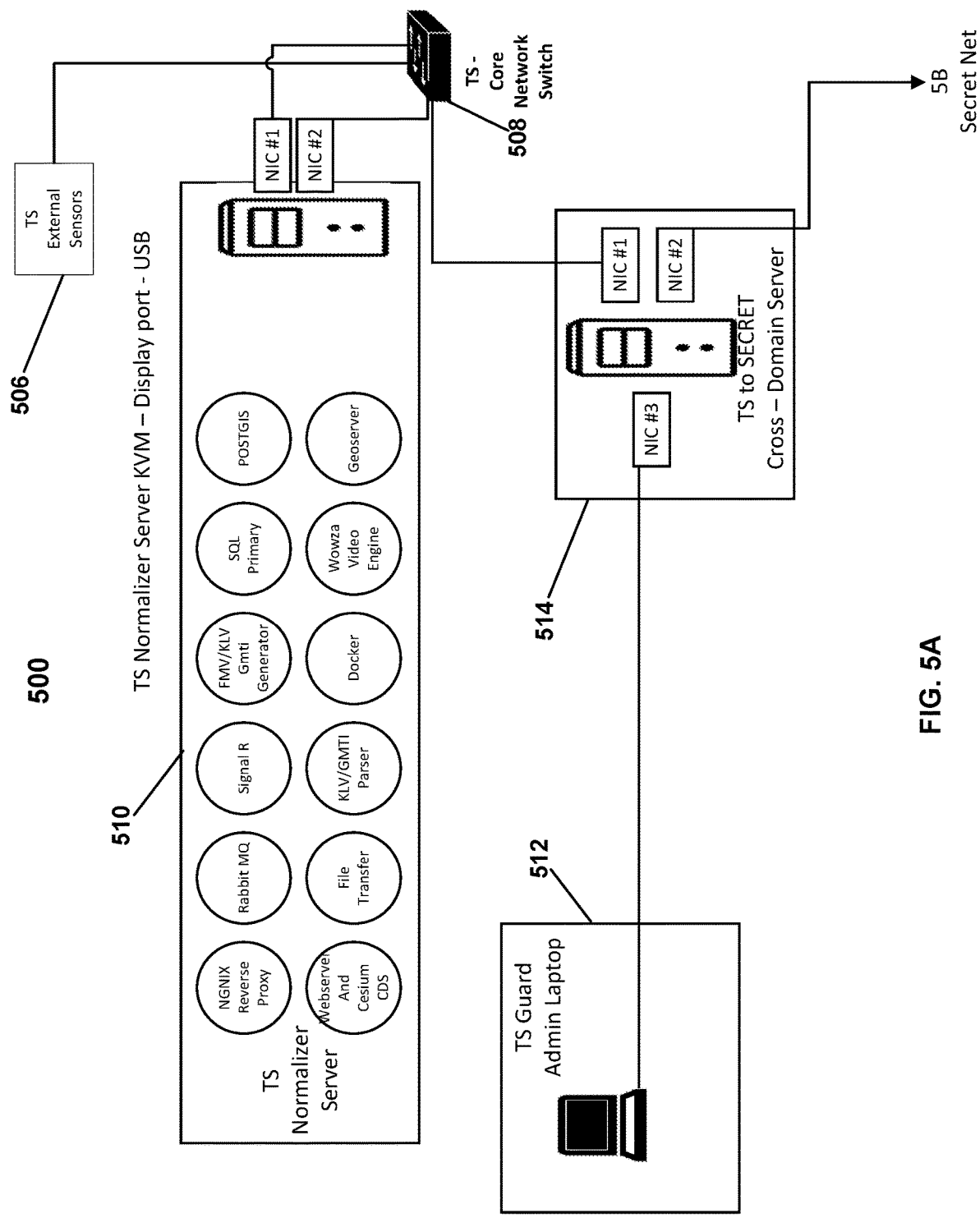
FIG. 5A depicts a first part of a system according to exemplary embodiments.
Figure 5B:
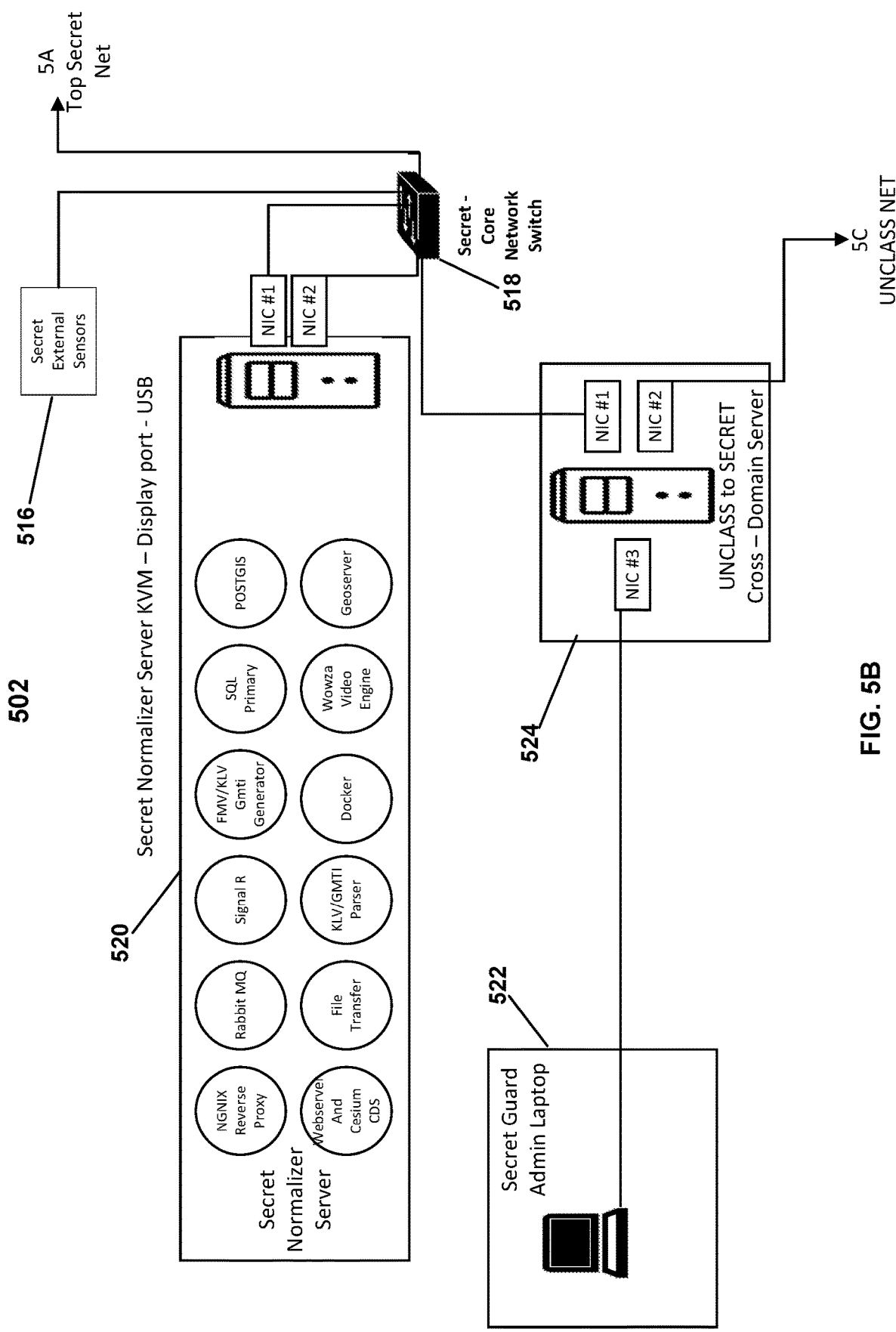
FIG. 5B depicts a second part of a system according to exemplary embodiments.
Figure 5C:
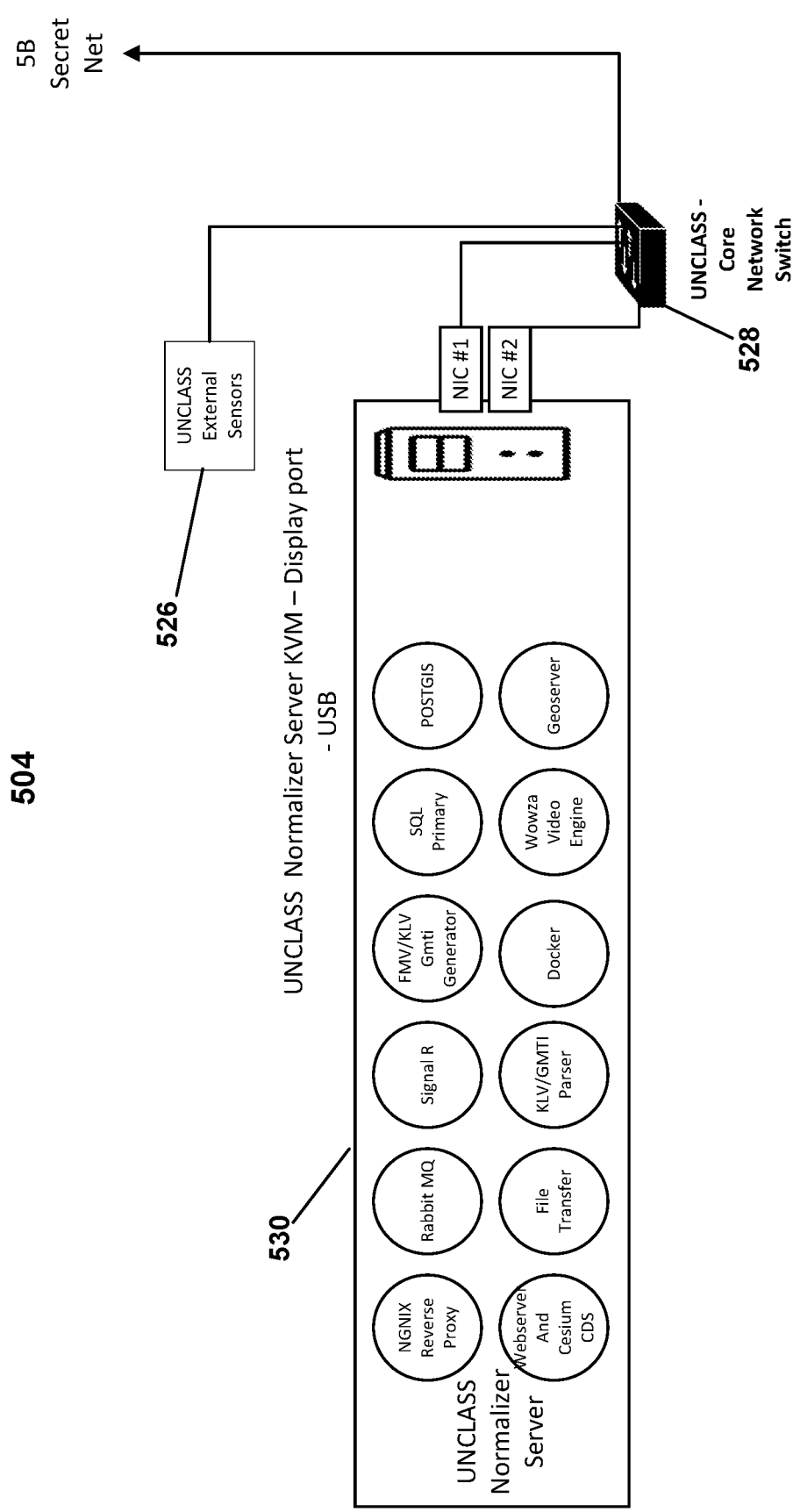
FIG. 5C depicts a third part of a system according to exemplary embodiments.

FIGS. 5A, 5B, and 5C depict a system according to exemplary embodiments. Each FIGS. 5A, 5B, and 5C depicts a portion of the system (top secret 500, secret 502, and unclassified 504). FIGS. 5A, 5B, and 5C are interconnected as depicted. FIG. 5A connects to FIG. 5B and FIG. 5B connected to FIG. 5C.

Starting with FIG. 5A, the top secret domain system 500, there may be external sensors 506 that input data into a network switch 508. The external sensors 506 may provide data at a top secret level, as well as data at secret and unclassified levels. The external sensors 506 are exemplary and non-limiting, as other top secret data inputs may be provided to the top secret system 500. The network switch 508 may be dedicated to the top secret domain. The network switch 508 is communicatively coupled to a normalization server 510 and a cross-domain server 514. The normalization server 510 may have a plurality of components, such as those depicted in FIG. 5A. The normalization server 510 may have network interface cards, such as the two depicted in FIG. 5A. The domain may have an administrative laptop or other computing device 512. This device 512 may be communicatively coupled to a cross-domain server 514. The cross-domain server 514 may have network interface cards, such as the three depicted in FIG. 5A. The normalization server 510 and the cross-domain server 514 may be communicatively coupled through the network switch 508. The cross-domain server 514 may be communicatively coupled to the secret domain system 502 (shown in FIG. 5B).

Core components of the normalization server may include:
  IIS Webserver;
  GeoServer;
  PostGIS map repository with OpenStreet Map data layer;
  Wowza video engine; and
  SQL database with open API.

The core components may be hosted in a suitable operating system environment. For example, Windows 2016 standard server operating system may be used.

The above described components are meant to be exemplary and non-limiting examples, as the server may include other or different components.

In exemplary embodiments, OASIMSS may have four server component types:
  Map Module;
  Video Module;
  Webserver Module; and
  Database Module.

An exemplary environment may host the above components on a VPC configuration (e.g., Azure VPC). For example, the OASIMSS software may be run on VMware ESX 6.5, AWS Cloud (Azure and Google), and physical server hardware. The OASIMSS software components may be an amalgam of different subparts that are integrated together to deliver an optimal user experience. Portions of the system also support additional add-on integrations for extensions (reports, automation, etc.). The following section describes the component data paths between OASIMSS components according to an exemplary implementation.

Regarding the webserver, according to exemplary embodiments, Internet Information Services (IIS) may be used. IIS represents a web server software package designed for Windows Server. It may be used for hosting websites and other content on the Web. Microsoft's Internet Information Services provides a graphical user interface (GUI) for managing websites and associated users. It provides a visual means of creating, configuring, and publishing sites on the web. The IIS Manager tool allows web administrators to modify website options, such as default pages, error pages, logging settings, security settings, and performance optimizations. For example, when a visitor accesses a page on a static website, IIS sends the HTML and associated images to the user's browser. When a page on a dynamic website is accessed, IIS runs any applications and processes any scripts contained in the page, then sends the resulting data to the user's browser.

Regarding the front-end web application, according to exemplary embodiments, it connects to the API for data served from the database. By using this layer of abstraction, changes to the database may occur without requiring changes in the front-end layer. This also allows for several optimization technologies to be used to serve the data quicker versus direct queries to the database. The API also provides for numerous other clients to connect for multiple extensions such as ad hoc reporting or possibly automation of repetitive tasks. The front-end and the API are not required to be installed on the same server. The API may require a user to authenticate themselves, using the OAuth2 protocol to obtain a token, before consuming the endpoints.

According to an exemplary embodiment, the API may be tightly coupled with the database. For example, the API's data models may be built dynamically based on the current database structure and allows for several caching and data optimization technologies to be used to serve the data quicker to the API consumers. For example, the API and the database may be hosted on the same server to allow for minimum latency between the two. Other configurations may be supported.

In exemplary embodiments, the front-end system has several maps that are connected to the GeoServer backend to serve maps of various locations and different scales of detail. CesiumJS itself manages the user interactions and then makes the necessary calls to GeoServer to be served the multiple maps and layers that are needed to be displayed to the user.

According to exemplary embodiments, SignalR for ASP-.net may be used to provide real-time map updates to include FMV (full motion video) KLV (key length value) platform locations or GMTI (ground moving target indicator) tracks. ASP.NET SignalR is a library for ASP.NET developers to add real-time web functionality to their applications. Real-time web functionality is the ability to have server-side code push content to the connected clients as it happens, in real-time.

SignalR takes advantage of several transports, automatically selecting the best available transport given the client's and server's capabilities. SignalR takes advantage of Web-Socket, an HTML5 API that enables bi-directional communication between the browser and server. SignalR may use WebSockets under the covers when available, and gracefully fall back to other techniques and technologies when it is not, while the application code remains the same. SignalR also provides a simple, high-level API for doing server-to-client RPC (call JavaScript functions in a client's browser from server-side .NET code) in an ASP.NET application, as well as adding useful hooks for connection management, such as connect/disconnect events, grouping connections, authorization. SignalR data image ingests the KLV metadata from the GMTI parser relaying the pertinent KLV metadata to cesium for display while also sending data to rabbit MQ destined for the SQL database for archiving purposes.

In exemplary embodiments, the Wowza Streaming Engine may be used. This streaming engine may include a unified streaming media server software developed by Wowza Media Systems. The server may be used for streaming of live and on-demand video, audio, and rich Internet applications over IP networks to desktop, laptop, and tablet computers, mobile devices. The Wowza video engine may accept the UDP video stream with KLV embedded and allow for the video to be viewed from the web application. The server may include a Java application deployable on most operating systems.

Using the OASIMSS, video software video streams may be automatically ingested through the CODEC auto-identification technique. For example, to ensure that full motion video (FMV) data products are disseminated maintaining appropriate standards, once ingested into the system, FMV streams that are not in the North Atlantic Treaty Organization (NATO) Standardization Agreement (STANAG) standard may be dynamically automatically re-encoded to be NATO Motion Imagery Standard Board (MISB) compliant, ensuring that all full motion video (FMV) data products are disseminated maintaining appropriate standards. This implementation is exemplary and non-limiting as other standard conversions may be used for different applications.

An exemplary embodiment may use GeoServer, which represents an open-source software server written in Java that allows users to share and edit geospatial data. Designed for interoperability, it publishes data from any major spatial data source using open standards. POSTGIS (described below) and the imagery file repositories may represent data sources for the map data display that Geoserver serves to the Cesium front end component.

PostGIS represents a database which adds spatial functions such as distance, area, union, intersection, and specialty geometry data types to PostgreSQL Spatial databases store and manipulate spatial objects like any other object in the database. This database may hold stored data of different types (e.g., numeric, text, timestamps, OASIMSS, images, etc.) and, when needed, the database may query (fetch) that to answer questions with the data. The exemplary queries may relate to: 'how many people logged on to your website' or 'how many transactions have been made in an online store.' Spatial functions may instead answer questions such as 'how close is the nearest shop,' 'is this point inside this area' or 'what is the size of this country.' The data may be stored in rows and columns in PostGIS as a spatial database. For example, the information may also have a geometry column with data in a specific coordinate system defined by spatial reference identifier (SRID).

Open Street Map (OSM) data may be stored in the POSTGIS database, which is attached to GeoServer. The Open Street Map data repository in OASIMSS may be used to enable a variety of capabilities, including enabling regional indexing of Geospatial data and using Open street map data. OASIMSS may search the following exemplary data fields:

- Cities, towns, suburbs, villages, etc.;
- Points of Interest;
- Public facilities such as government offices, post office, police, hospitals, pharmacies, culture, restaurants, pubs, cafes, etc.;
- Hotel, motels, and other places to stay the night;
- Supermarkets, bakeries, etc.;
- Tourist information, sights, museums, etc.;
- Places of worship such as churches, mosques, etc; and
- Natural features.

OpenStreetMap (OSM) represents a collaborative project to create a free, editable map of the world. The data from OSM may be used in various ways including the production of paper maps and electronic maps, geocoding of addresses and place names, and route planning.

For the database, according to exemplary embodiments, Microsoft SQL Server may be used. Microsoft SQL represents a relational database management system (RDBMS) that supports a wide variety of transaction processing, business intelligence, and analytics applications in corporate IT environments. Microsoft SQL Server is one of the three market-leading database technologies, along with Oracle Database and IBM's DB2. Like other RDBMS software, Microsoft SQL Server is built on top of SQL, a standardized programming language that database administrators (DBAs) and other IT professionals use to manage databases and query the data they contain. SQL Server is tied to Transact-SQL (T-SQL), an implementation of SQL from Microsoft that adds a set of proprietary programming extensions to the standard language and is utilized for replication across the enterprise. The underlying database is Microsoft SQL Server, and the design paradigm used for structuring the tables is Third Normal Form (3NF). There are stored procedures that are coded within the database as well to provide optimization for some more significant queries as well as to offer a queueing service for routine updates (i.e., status checks).

To optimize the use of the database, the application program interface (API) may be used to allow for access using a standards-based architecture. The OASIMSS API may be used primarily as a gateway between the front end React.js code and the database. The architecture of the OASIMSS API is built using REST principles and could be consumed by other clients based on various applications and use cases.

By way of background, an application program interface (API) is a set of routines, protocols, and tools for building software applications. An API specifies how software components should interact and makes data accessible to outside systems. Additionally, APIs are used when programming graphical user interface (GUI) components, oftentimes by third-party software developers. An API can make it easier to develop a program by providing all the building blocks. This allows software developers to then put the blocks together either in a new graphical interface or to contribute to an entirely new outside construct.

Swagger UI may be used in exemplary embodiments as the real-time documentation, interaction, and unit testing mechanism for the API.

According to exemplary embodiments, the OASIMSS API may be built using representational state transfer (REST) principles, and its internal design may be divided into two major categories of endpoints: (1) collection management (personnel, platforms, etc.) and (2) business logic/actions (intel request/mission management workflows).

The OASIMSS API may utilize Microsoft Identity Manager authentication. Microsoft Identity Manager (MIM) 2016 builds on the identity and access management capabilities of Forefront Identity Manager. Like its predecessor, MIM helps you manage the users, credentials, policies, and access within your organization. Additionally, MIM 2016 adds a hybrid experience, privileged access management capabilities, and support for new platforms.

For example, with MIM, an organization may simplify identity lifecycle management with automated workflows, business rules and easy integration with heterogeneous platforms across the datacenter. MIM enables the organization to have the right users and access rights for Active Directory for on-premises apps, and Azure AD Connect can then make available in Azure AD for Office 365 and cloud-hosted apps. Common MIM scenarios include:

- Automatic identity and group provisioning based on business policy and workflow-driven provisioning;
- Integration of the contents of directories with HR systems and other sources of authority; and
- Synchronizing identities between directories, databases, and on-premises applications through common APIs and protocols, Microsoft-delivered connectors, and partner-delivered connectors.

The API may support being invoked from any source that can submit an HTTP request. Each endpoint has its data parameter requirements. HTTP responses may default to JSON or XML, as required.

The above components are exemplary and non-limiting and the normalization server may have additional components or may have less than the components described.

Next is FIG. 5B, the secret domain system 502, there may be external sensors 516 that input data into a network switch 518. The external sensors 516 may provide data at a secret level, as well as data at an unclassified level. The external sensors 516 are exemplary and non-limiting, as other secret data inputs may be provided to the secret system 502. The network switch 518 may be dedicated to the secret domain. The network switch 518 is communicatively coupled to a normalization server 520 and a cross-domain server 524. The normalization server 520 may have a plurality of components, such as those depicted in FIG. 5B. The components may be similar to those described above with respect to FIG. 5A above. The normalization server 520 may have network interface cards, such as the two depicted in FIG. 5B. The domain may have an administrative laptop or other computing device 522. This device 522 may be communicatively coupled to a cross-domain server 524. The cross-domain server 524 may have network interface cards, such as the three depicted in FIG. 5B. The normalization server 520 and the cross-domain server 524 may be communicatively coupled through the network switch 518. The cross-domain server 524 may be communicatively coupled to the unclassified domain system 504 (shown in FIG. 5C).

Next is FIG. 5C, the unclassified domain system 504, there may be external sensors 526 that input data into a network switch 528. The external sensors 526 may provide data at an unclassified level. The external sensors 526 are exemplary and non-limiting, as other unclassified data inputs may be provided to the unclassified system 504. The network switch 528 may be dedicated to the unclassified domain. The network switch 528 is communicatively coupled to a normalization server 530. The normalization server 530 may have a plurality of components, such as those depicted in FIG. 5C. The components may be similar to those described above with respect to FIGS. 5A and 5B. The normalization server 530 may have network interface cards, such as the two depicted in FIG. 5C. The domain may have an administrative laptop or other computing device, not shown. This device may be communicatively coupled to the system, such as the network switch 528. The unclassified domain system 504 may be communicatively coupled to the secret system (shown in FIG. 5C).

The foregoing examples show the various embodiments in exemplary configurations; however, it should be appreciated that the various components may be configured in a variety of ways. Further, it should be appreciated that the components of the various embodiments may be combined into one or more devices, collocated on a particular node of a distributed network, or distributed at various locations in a network, including being geographically separated, for example. As will be appreciated by those skilled in the art, the components of the various embodiments may be arranged at any location or locations within a distributed network without affecting the operation of the respective system.

As described above, the various embodiments support a number of devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, application, or software.

The foregoing examples show the various embodiments in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation the various embodiments may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments. For example, the programming language used may include assembly language, Ada, APL, Basic, C, C++, COBOL, dBase, Forth, Fortran, Java, Modula-2, Pascal, Prolog, REXX, Visual Basic, and/or JavaScript. Further, it is not necessary that a single type of instructions or single programming language be utilized in conjunction with the operation of the system and method of the various embodiments. Rather, any number of different programming languages may be utilized as is necessary or desirable.

Also, the instructions and/or data used in the practice of various embodiments may utilize any compression or encryption technique or algorithm, as may be desired. An encryption module might be used to encrypt data. Further, files or other data may be decrypted using a suitable decryption module, for example.

In the system and method of exemplary embodiments, a variety of "user interfaces" may be utilized to allow a user to interface the systems described in the various embodiments. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

It will be readily understood by those persons skilled in the art that the various embodiments are susceptible to broad utility and application. Many embodiments and adaptations other than those herein described, as well as many variations, modifications and equivalent arrangements, will be apparent from or reasonably suggested by the various embodiments and foregoing description thereof, without departing from the substance or scope of the various embodiments.

Accordingly, while the various embodiments have been described here in detail in relation to its exemplary embodiments, it is to be understood that this disclosure is only illustrative and exemplary of the various embodiments and is made to provide an enabling disclosure of the various embodiments. Accordingly, the foregoing disclosure is not intended to be construed or to limit the various embodiments or otherwise to exclude any other such embodiments, adaptations, variations, modifications or equivalent arrangements.

Although the embodiments have been described herein in the context of a particular implementation in a particular environment for a particular purpose, those skilled in the art will recognize that its usefulness is not limited thereto and that the embodiments can be beneficially implemented in other related environments for similar purposes.

What is claimed is:

1. A system, comprising:
   one or more external data sources configured to generate one or more output data streams in a first format;
   a network switch configured to receive the one or more output data streams and communicatively coupled to a guard normalization server and a cross domain guard;
   the guard normalization server communicatively coupled to the network switch via a network interface card and running on at least one computer processor and configured to receive the output data streams in the first format, convert the output data streams to a second format and transmit the converted output data streams in the second format to the cross domain guard; and
   the cross domain guard communicatively coupled to the guard normalization server and configured to receive the converted output data streams in the second format and then transmit the converted output data streams to a second network switch that in turn transmits the converted output data streams to at least one server that is configured to process the converted output data streams at a specific classification level.

2. The system according to claim 1, wherein the guard normalization server and the cross domain guard are integrated into a consolidated unit.

3. The system according to claim 2, wherein the integrated guard normalization server and cross domain guard comprise a portable system.

4. The system according to claim 1, wherein the guard normalization server and the cross domain guard comprise a portable system.

5. The system according to claim 1, wherein the first format is a proprietary format and the second format is based on a standard.

6. The system according to claim 1, wherein the cross domain guard prevents data transmission of the converted output data streams to the at least one server when the converted output data streams contain data at a higher classification level than the specific classification level.

7. The system according to claim 1, further comprising:
   a second set of external data sources configured to generate one or more second output data streams in a third format;
   the second network switch configured to receive the one or more second output data streams and communicatively coupled to a second guard normalization server and a second cross domain guard;
   the second guard normalization server communicatively coupled to the second network switch via a second network interface card and running on at least a second computer processor and configured to receive the second output data streams in the third format, convert the second output data streams to a fourth format and transmit the converted second output data streams in the fourth format to the second cross domain guard; and
   the second cross domain guard communicatively coupled to the second guard normalization server and configured to receive the converted second output data streams in the fourth format and then transmit the converted second output data streams via a third network switch to a second server wherein second server is configured to process the converted second output data streams at a second specific classification level.

8. The system according to claim 1, wherein the output data streams comprise full-motion video.

9. The system according to claim 1, wherein the output data streams comprise high-definition imagery.

10. The system according to claim 1, wherein the output data streams are carried on one or more channels.

11. The system according to claim 1, the guard normalization server being further configured to archive the output data streams in the first format and provide access to the archived data through an application programming interface.

12. The system according to claim 1, the guard normalization server being further configured to output a real-time data stream in the second format.

13. A method, comprising:
receiving, at a guard normalization server, one or data streams in a first format, the one or more data streams being generated by one or more external data sources and being received in a domain with a first classification level;
converting, by the guard normalization server, the one or more output data streams to a second format;
transmitting, by the guard normalization server, the converted output data streams in the second format to a cross domain guard; and
processing, by the cross domain guard, the converted output data streams in the second format for transmission to at least one server located in a second domain and that is configured to process the converted output data streams at a second classification level, wherein the second classification level is higher than the first classification level and the processing by the cross domain guard comprises transmitting the converted output data streams without further modification.

14. The method according to claim 13, wherein the first format is a proprietary format.

15. The method according to claim 13, wherein the second format is based on a standard.

16. The method according to claim 13, wherein the output data streams comprise full-motion video.

17. The method according to claim 13, wherein the output data streams comprise high-definition imagery.

18. The method according to claim 13, wherein the output data streams are carried on one or more channels.

* * * * *